(12) United States Patent
Jeun

(10) Patent No.: US 10,807,686 B2
(45) Date of Patent: Oct. 20, 2020

(54) STRIKE ASSEMBLY TYPE FIXING DEVICE FOR SHIPYARD

(71) Applicant: Ha Chul Jeun, Busan (KR)

(72) Inventor: Ha Chul Jeun, Busan (KR)

(73) Assignee: Ha Chul Jeun, Busan (KR)

( * ) Notice: Subject to any disclaimer, the term of this patent is extended or adjusted under 35 U.S.C. 154(b) by 11 days.

(21) Appl. No.: 16/076,678

(22) PCT Filed: Feb. 10, 2017

(86) PCT No.: PCT/KR2017/001477
§ 371 (c)(1),
(2) Date: Aug. 8, 2018

(87) PCT Pub. No.: WO2017/138767
PCT Pub. Date: Aug. 17, 2017

(65) Prior Publication Data
US 2019/0039689 A1    Feb. 7, 2019

(30) Foreign Application Priority Data
Feb. 11, 2016  (KR) .................. 10-2016-0015667

(51) Int. Cl.
| | |
|---|---|
| F16B 4/00 | (2006.01) |
| F16B 43/00 | (2006.01) |
| B63B 73/00 | (2020.01) |
| F16B 37/04 | (2006.01) |
| F16B 33/00 | (2006.01) |

(Continued)

(52) U.S. Cl.
CPC ............... *B63B 73/00* (2020.01); *B63C 5/02* (2013.01); *E04G 5/08* (2013.01); *E04G 7/28* (2013.01); *F16B 13/126* (2013.01); *F16B 19/14* (2013.01); *F16B 33/004* (2013.01); *F16B 37/048* (2013.01); *F16B 43/001* (2013.01);
(Continued)

(58) Field of Classification Search
CPC .... F16B 37/068; F16B 33/004; F16B 43/001; F16B 4/004; F16B 5/0275
USPC .......................................... 411/107, 180, 453
See application file for complete search history.

(56) References Cited

U.S. PATENT DOCUMENTS

| | | | | |
|---|---|---|---|---|
| 2,515,773 A | * | 7/1950 | Johnson | .................. F16B 19/02 |
| | | | | 411/453 |
| 2,761,349 A | * | 9/1956 | Heller | ..................... F16B 37/00 |
| | | | | 411/432 |

(Continued)

FOREIGN PATENT DOCUMENTS

| | | | |
|---|---|---|---|
| JP | 2003-097522 A | | 4/2003 |
| JP | 4443945 B2 | * | 3/2010 |

(Continued)

*Primary Examiner* — Flemming Saether

(57) ABSTRACT

The present invention provides a strike assembly type fixing device for a shipyard, in which the lower end of a fixture is inserted into a fixing groove formed in a fixing plate and the upper end of the fixture is screwed to be coupled to a separate fastening element are fixed. The strike assembly type fixing device for a shipyard according to the present invention is configured such that a protruding flange inclined downward is integrally formed with a fixture to form a single body at a portion where an upper end and a lower end of a fixture are connected to each other, and a packing ring is provided to be inserted into the lower end of the fixture in close contact with the protruding flange.

4 Claims, 9 Drawing Sheets

(51) Int. Cl.
*B63C 5/02* (2006.01)
*E04G 5/08* (2006.01)
*E04G 7/28* (2006.01)
*F16B 19/14* (2006.01)
*F16B 13/12* (2006.01)

(52) U.S. Cl.
CPC ..... *B63B 2221/08* (2013.01); *B63C 2005/025* (2013.01); *F16B 4/004* (2013.01)

(56) References Cited

U.S. PATENT DOCUMENTS

| | | | | |
|---|---|---|---|---|
| 2,983,534 | A * | 5/1961 | Heller | F16B 43/001 411/542 |
| 3,331,272 | A * | 7/1967 | Hanneman | F16B 43/001 411/369 |
| 3,678,979 | A * | 7/1972 | Bjorklumd | F16B 43/001 411/134 |
| 3,897,713 | A * | 8/1975 | Gugle | F16B 5/0275 411/389 |
| 4,875,818 | A * | 10/1989 | Reinwall | F16B 33/004 411/369 |
| 6,789,989 | B2 * | 9/2004 | Walther | F16B 35/06 411/186 |
| 6,824,342 | B2 * | 11/2004 | Gassmann | F16B 19/14 411/441 |
| 6,918,727 | B2 * | 7/2005 | Huang | F16B 5/0275 411/107 |
| 7,214,021 | B2 * | 5/2007 | Caponi | F16B 2/005 403/298 |
| 8,517,654 | B2 * | 8/2013 | Buhri | F16B 19/14 411/424 |
| 9,797,352 | B2 * | 10/2017 | Nola | F02M 35/10085 |
| 9,937,693 | B2 * | 4/2018 | Erb | B32B 37/1292 |
| 2004/0105735 | A1 * | 6/2004 | Favre-Bulle | F16B 37/06 411/147 |

FOREIGN PATENT DOCUMENTS

| | | |
|---|---|---|
| KR | 10-2006-0028474 A | 3/2006 |
| KR | 10 2009 0013795 A | 2/2009 |

* cited by examiner

US 10,807,686 B2

STRIKE ASSEMBLY TYPE FIXING DEVICE FOR SHIPYARD

FIELD OF INVENTION

The present invention relates to a strike assembly type fixing device for a shipyard, in which a lower end of a fixture is insertedly coupled to a fixing recess formed on a fixing plate (made of a rigid bottom material such as steel, concrete, rock, or the like) and an upper end of the fixture is threaded to allow a separate fastening element be coupled thereto so as to fix a grating, a scaffolding for working, and the like, and more particularly, to a strike assembly type fixing device for a shipyard, in which a protruding flange formed inclinedly downwardly at the connection portion between the upper end and the lower end of the fixture is integrally formed with the fixture to form a single body, and a packing ring is provided which is fitted around the lower end of the fixture so as to be brought into close contact with the protruding flange so that the fixture is fixed to the fixing plate by a compressive force by strike, thereby exhibiting the properties of being resistant to a lateral force and preventing a breakage of the lower end owing to a primary fixation by the lower end and a secondary fixation by the protruding flange, and simultaneously achieving the pressing effect of the protruding flange having a downwardly inclined structure, the improvement of sealibility by the packing ring, the excellent foreign substance blocking effect, as well as the manufacturing process of the fixture is simplified, thereby reducing the manufacturing cost, and which is, in particular, applied to fix a grating installed in the shipyard so that even under high salt conditions due to the inflow of seawater through various routes in a ship building process, the fixing force of the fixture with respect to the fixing plate is maximized and the airtightness by the packing ring is improved, thereby preventing the occurrence of fine gaps between the fixing plate and the fixture, and thus blocking the penetration of salt to prevent the corrosion of the fixture and promote durability of the fixture.

BACKGROUND OF THE INVENTION

In general, a fixing element used to fix a scaffolding for working, and the like is inserted into a bore-hole drilled previously in a rigid bottom such as wall, concrete, rock or the like so as to be coupled to the bottom or a fixing plate. As a prior art associated with such a fixing element, Korean Patent Laid-Open Publication No. 10-2002-0083917 entitled "Fixing Element" and Korean Patent Laid-Open Publication Nos. 10-2014-0064977 entitled "Fastening System" have been proposed.

Korean Patent Laid-Open Publication No. 10-2002-0083917 discloses a general fixing element configured to be inserted into a bore-hole drilled previously in a rigid bottom such as concrete, rock, steel or the like using a setting device driven by high-pressure gas, the fixing element including a shaft 1, 11 or 21 having a free end formed flatly and a load acting means 2, 12 or 22, wherein the external contour of the shaft 1, 11 or 21 is formed in a cylindrical shape. In addition, Korean Patent Laid-Open Publication Nos. 10-2014-0064977 discloses a fastening system 1 configured to fix an accessory part 14 to a setting object 17 by means of a setting bolt 2, the fastening system which includes: the setting bolt 2 formed with a first end 3 and a second end 4 and having a fixed region 5 and a load applying region 6; a ring- or sleeve-shaped sealing element 10 having an opening 13 formed therein to seal the setting bolt 2 to be inserted into the setting object 17; and the accessory part 14, for example, a grating plate, an electric fastening device or a spacer that is configured to be fixed to the load applying region 6 of the setting bolt 2. According to the fastening system, the corrosion of the setting bolt 2 should be suppressed permanently, and the sealing element 10 is supported at a first end 11 thereof by the setting object 17 and at a second end 12 thereof by the accessory part 14 and/or the setting bolt 2 in an inserted state of the setting bolt 2 so that the sealing element 10 is extended in an axial direction.

However, such conventional inventions has a simple structure in which a lower end 22 of a fixture 20 is insertedly coupled to a fixing recess 11 formed on the top surface of a fixing plate 10 as shown in FIG. 1. Therefore, a problem occurs in that when a lateral external force is repeatedly exerted on the fixture protruded outwardly from the surface of the fixing plate 10 or the lateral external force is large, the fixation stability is deteriorated.

SUMMARY OF INVENTION

Accordingly, the present invention has been made in order to solve the above-described problems occurring in the prior art, and it is an object of the present invention is to provide a novel strike assembly type fixing device for a shipyard in which a protruding flange formed inclinedly downwardly at the connection portion between an upper end and a lower end of the fixture is integrally formed with a fixture to form a single body, and a packing ring is provided which is fitted around the lower end of the fixture so as to be brought into close contact with the protruding flange so that the fixture is fixed to a fixing plate by a compressive force by strike, thereby exhibiting the properties of being resistant to a lateral force and preventing a breakage of the lower end owing to a primary fixation by the lower end and a secondary fixation by the protruding flange, and simultaneously achieving the pressing effect of the protruding flange having a downwardly inclined structure, the improvement of sealibility by the packing ring, the excellent foreign substance blocking effect, as well as the manufacturing process of the fixture is simplified, thereby reducing the manufacturing cost.

Another object of the present invention is to provide a novel strike assembly type fixing device for a shipyard, which is applied to fix a grating installed in the shipyard so that even under high salt conditions due to the inflow of seawater through various routes in a ship building process, the fixing force of a fixture with respect to a fixing plate is maximized and the airtightness by a packing ring is improved, thereby preventing the occurrence of fine gaps between the fixing plate and the fixture, and thus blocking the penetration of salt to prevent the corrosion of the fixture and promote durability of the fixture, and in which a state in which the packing ring made of a rubber material to have elasticity is pressed by the fixture the airtightness is maintained to maximize sealibility, and simultaneously the fixture and the fixing plate are sealingly coupled to each other by means of the packing ring so as to prevent a damage of the fixture or the fixing plate while smoothly absorbing vibrations even under various vibration producing conditions.

To achieve the above objects, the present invention provides a strike assembly type fixing device for a shipyard, including: a fixing plate 10 having a fixing recess 11 formed thereon; a fixture 20 including an upper end 21 having threads formed thereon so as to be coupled with a separate fastening element 50, a lower end 22 fittingly fixed to the fixing recess of the fixing plate 10, and a protruding flange 23 formed inclinedly downwardly along an outer circumferential surface of a connection portion between the upper end 21 and the lower end 22, wherein the upper end 21, the lower end 22, and the protruding flange 23 are formed integrally with each other; and a packing ring 30 fitted around the lower end 22 of the fixture 20 so as to be brought into close contact with an underside of the protruding flange 23, whereby when the fixture 20 is fixed to the fixing plate 10, the packing ring 30 is brought into close contact with the underside of the protruding flange 23 of the fixture 20 and the surface of a peripheral portion of the fixing recess 11 of the fixing plate 10 while pressing the underside of the protruding flange 23 and the peripheral portion surface of the fixing recess 11 so as to prevent liquid, gas, or foreign substances from being introduced into a space defined between the fixture 20 and the fixing plate 10, and the fixture 20 is securely fixed to the fixing plate 10 while the protruding flange 23 formed integrally with the upper end 21 and the lower end 22 presses the peripheral portion surface of the fixing recess 11 so as to increase a fixing force.

The strike assembly type fixing device for a shipyard according to the present invention has effects in that it exhibits the properties of being resistant to a lateral force and preventing a breakage of the lower end owing to a primary fixation by the lower end and a secondary fixation by the protruding flange, and simultaneously achieves the pressing effect of the protruding flange having a downwardly inclined structure, the improvement of sealibility by the packing ring, the excellent foreign substance blocking effect, as well as the manufacturing process of the fixture is simplified, thereby reducing the manufacturing cost.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Figure 1:
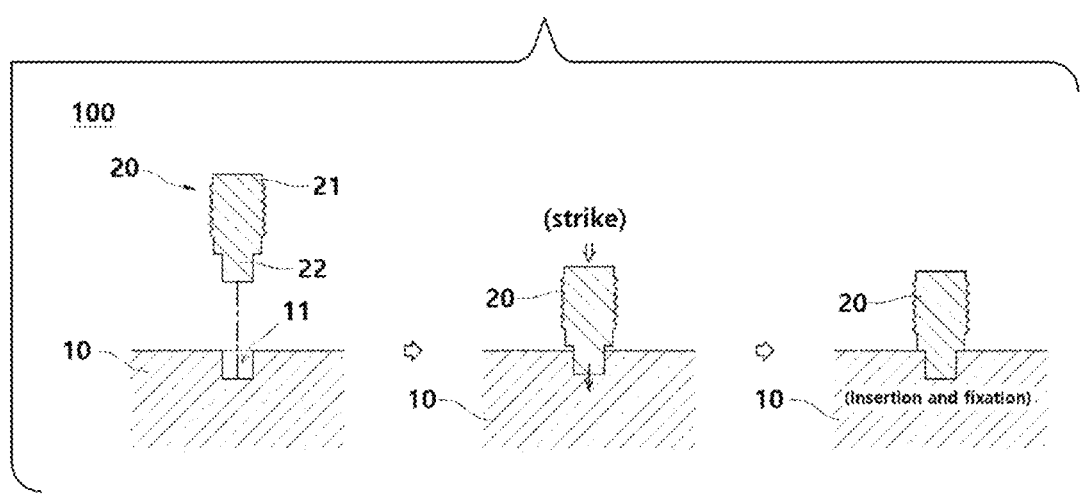
FIG. 1 is a view showing a conventional technology.

Hereinafter, a strike assembly type fixing device for a shipyard according to a preferred embodiment of the present invention will be described in further detail with reference to the accompanying drawings.

The strike assembly type fixing device for a shipyard according to a preferred embodiment of the present invention is configured to include a fixing plate 10, a fixture 20, and a packing ring 30, and is aimed to securely fix a grating, a scaffolding for working, and the like, which are used in a shipyard.

The fixing plate 10 has a fixing recess 11 formed thereon. The fixing plate 10 may made of a rigid bottom material such as steel, concrete, rock, or the like. The fixture 20 is fixed to a preset position of the fixing plate 10, and a structure such as a grating or a scaffolding 200 for working is securely fixed to the fixing plate 10 by means of a separate fastening element 50, which is coupled to the fixture 20. The strike assembly type fixing device for a shipyard according to an embodiment of the present invention allows the fixture 20 to be securely fixed to the fixing plate 10 by virtue of improved fixation stability so as to minimize the occurrence of the danger of safety. In addition, the fixture 20 includes an upper end 21 that is having threads formed thereon so as to be coupled with a separate fastening element 50, a lower end 22 that is fittingly fixed to the fixing recess of the fixing plate 10, and a protruding flange 23 that is formed inclinedly downwardly along an outer circumferential surface of a connection portion between the upper end 21 and the lower end 22, wherein the upper end 21, the lower end 22, and the protruding flange 23 are formed integrally with each other. The fixture 20 may be made of a corrosion-resistant steel material. The upper end 21 of the fixture 20 may have male threads formed on an outer circumferential surface thereof or female threads formed on an inner circumferential surface thereof, and the fastening element 50 may be formed in a hollow cylindrical shape having female threads formed on an inner circumferential surface thereof or formed in a cylindrical shape having male threads formed on an outer circumferential surface thereof so as to correspond to the upper end 21 of the fixture 20.

In the strike assembly type fixing device for a shipyard according to the present invention, the protruding flange 23 of the fixture 20 may be formed in a circular band shape having a concentric structure in such a manner that the top surface and the bottom surface thereof are formed curvedly. Here, the protruding flange 23 of the fixture 20 may have an upwardly convex curved surface.

In addition, in the strike assembly type fixing device for a shipyard according to the present invention, the packing ring 30 may be formed in an annular ring shape having a preset thickness (d) in such a manner as to be shaped to be protruded radially outwardly from an outer circumferential edge 232 of the protruding flange 23 when the fixture 20 is fixed to the fixing plate 10 by a compressive force by strike.

Further, in the strike assembly type fixing device for a shipyard according to the present invention, any one of an inner circumferential surface of the fixing recess 11 of the fixing plate 10 and an outer circumferential surface of the lower end 22 of the fixture 20 may be implemented as a concavo-convex surface 40 formed with a repeated concavo-convex pattern. The concavo-convex surface 40 may be a knurled surface 40a formed by a knurling process.

In the meantime, in the strike assembly type fixing device for a shipyard according to the present invention, the inner circumferential surface of the fixing recess 11 of the fixing plate 10 and the outer circumferential surface of the lower end 22 of the fixture 20 may be formed with threads 111 and 221 so that the fixture 20 and the fixing plate 10 can be coupled to each other in a bolt-nut engagement manner.

Hereinafter, preferred embodiments of the present invention will be described in further detail with reference to FIGS. 2 to 11 in the accompanying drawings. In the meantime, in the detailed description and the accompanying drawings, illustration and explanation on the construction and operation which a person skilled in the art can easily understand from a general fixing plate, a fixture, a scaffolding for working, a packing ring, a concavo-convex surface, a knurling process, and the like will be briefly made or will be omitted to avoid redundancy. In particular, in the detailed description and the accompanying drawings, illustration and explanation on the detailed technical construction and operation of elements, which have no direct connection with the technical features of the present invention, will be omitted, and only the technical constructions directly related with the present invention will be briefly illustrated and explained.

Figure 2:
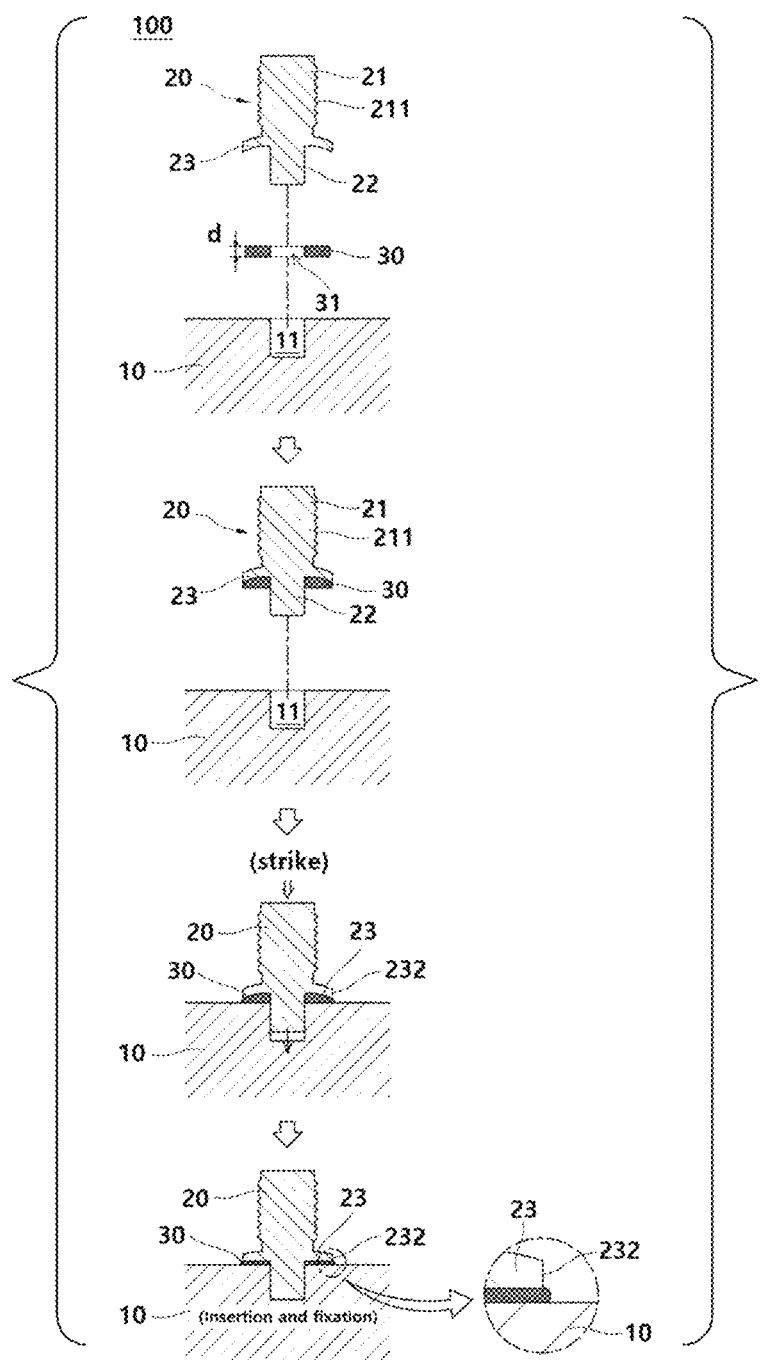
FIG. 2 is a cross-sectional view showing the configuration and operation of a strike assembly type fixing device for a shipyard according to an embodiment of the present invention.

In a best mode for carrying out the present invention, the strike assembly type fixing device 100 for a shipyard according to an embodiment of the present invention is configured to include a fixing plate 10, a fixture 20, and a packing ring 30 as shown in FIG. 2, and is aimed to securely fix a grating, a scaffolding for working, and the like, which are used in a shipyard.

In another best mode of the present invention, the fixing plate 10 has a fixing recess 11 formed thereon. The fixing plate 10 may made of a rigid bottom material such as steel, concrete, rock, or the like. The fixture 20 is fixed to a preset position of the fixing plate 10, and a structure such as a grating or a scaffolding 200 for working is securely fixed to the fixing plate 10 by means of a separate fastening element 50, which is coupled to the fixture 20. The strike assembly type fixing device for a shipyard according to an embodiment of the present invention allows the fixture 20 to be securely fixed to the fixing plate 10 by virtue of improved fixation stability so as to minimize the occurrence of the danger of safety.

The fixture 20 includes an upper end 21 that is having threads formed thereon so as to be coupled with a separate fastening element 50, a lower end 22 that is fittingly fixed to the fixing recess of the fixing plate 10, and a protruding flange 23 that is formed inclinedly downwardly along an outer circumferential surface of a connection portion between the upper end 21 and the lower end 22, wherein the upper end 21, the lower end 22, and the protruding flange 23 are formed integrally with each other. The fixture 20 may be made of a corrosion-resistant steel material. The upper end 21 of the fixture 20 may have male threads formed on an outer circumferential surface thereof or female threads formed on an inner circumferential surface thereof, and the fastening element 50 may be formed in a hollow cylindrical shape having female threads formed on an inner circumferential surface thereof or formed in a cylindrical shape having male threads formed on an outer circumferential surface thereof so as to correspond to the upper end 21 of the fixture 20.

Figure 3:
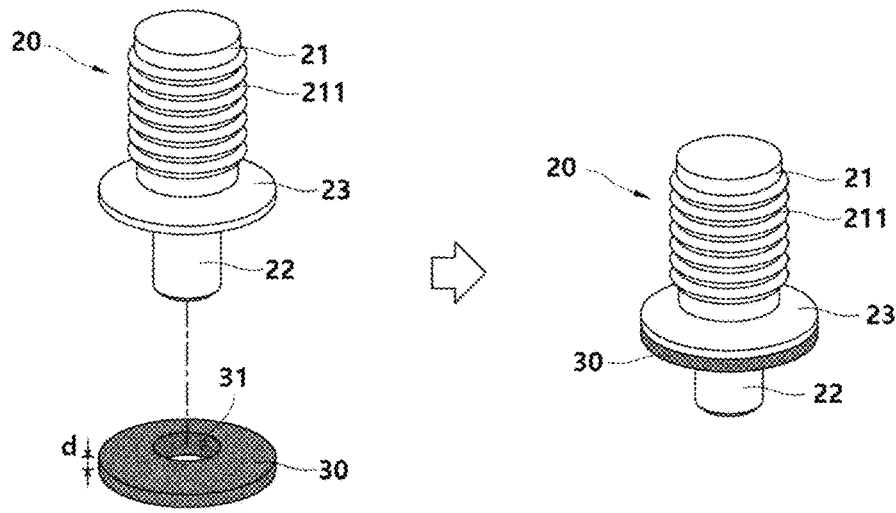
FIG. 3 is a top perspective view showing a fixture and a packing ring constituting a strike assembly type fixing device for a shipyard according to an embodiment of the present invention.

The protruding flange 23 of the fixture 20 according to an embodiment of the present invention is formed in a circular band shape having a concentric structure in such a manner that the top surface and the bottom surface thereof are formed curvedly as shown in FIG. 3. In particular, the protruding flange 23 of the fixture 20 according to an embodiment of the present invention has an upwardly convex curved surface. By virtue of this shape structure, when the fixture 20 is fixed to the fixing plate 10 by a compressive force by strike, plastic deformation is induced to minimize a damage of the fixture 20 and an increase in the compressive force of the fixture 20 with respect to the fixing plate 10 promotes the improvement of a fixing force.

The packing ring 30 is fitted around the lower end 22 of the fixture 20 so as to be brought into close contact with an underside of the protruding flange 23. The packing ring 30 according to an embodiment of the present invention may be formed in an annular ring shape having a preset thickness (d). Here, the packing ring 30 is preferably formed in such a manner as to be shaped to be protruded radially outwardly from an outer circumferential edge 232 of the protruding flange 23 as shown at the lower side of FIG. 2 when the fixture 20 is fixed to the fixing plate 10 by a compressive force by strike. In this case, the packing ring 30 may be made of a urethane rubber, NBR rubber or CR/EP rubber material. In particular, a portion of the packing ring 30, which is brought into close contact with the outer circumferential surface of the lower end 22 of the fixture 20, may be made of an NBR rubber material having a high oil resistance whereas a portion of the packing ring 30, which is brought into close contact with the protruding flange 23 of the fixture 20 and the fixing plate 10, may be made of an urethane rubber material.

Figure 4:
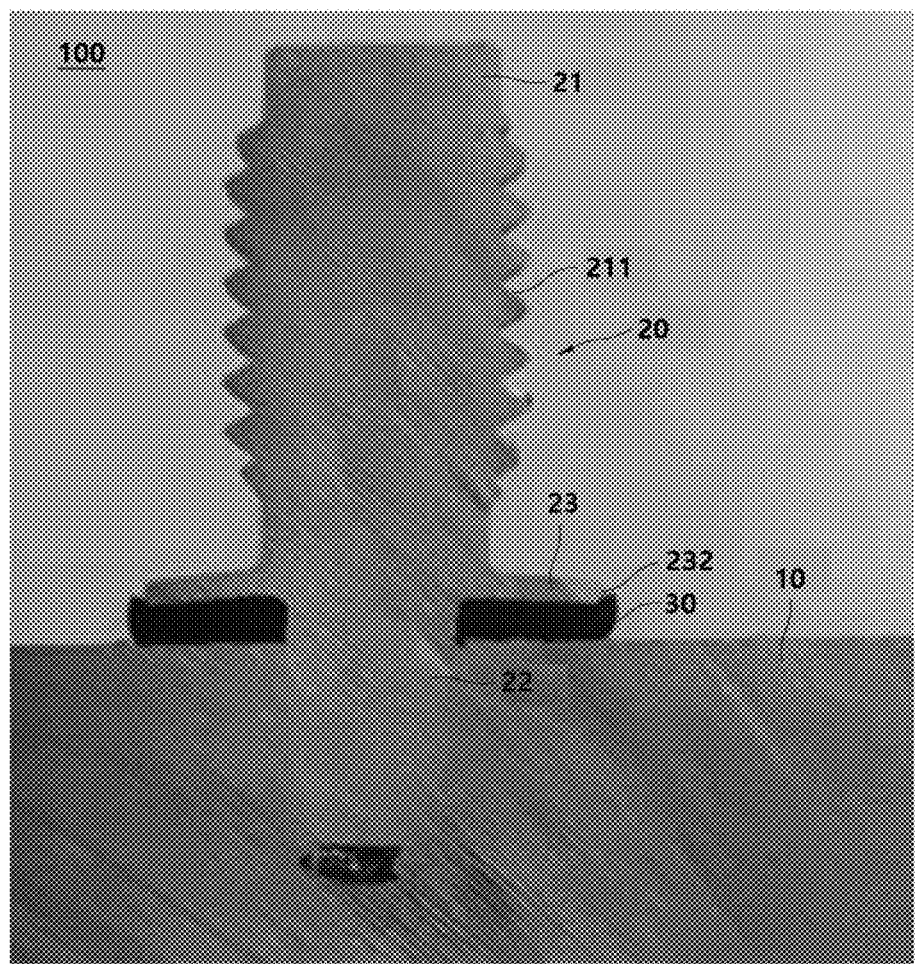
FIG. 4 is an exemplary view showing a state in which a fixture is securely fixed to a fixing plate in a strike assembly type fixing device for a shipyard according to an embodiment of the present invention.

In the strike assembly type fixing device 100 for a shipyard according to an embodiment of the present invention, when the fixture 20 is fixed to the fixing plate 10 by a compressive force by strike, the packing ring 30 is brought into close contact with the underside of the protruding flange 23 of the fixture 20 and the surface of a peripheral portion of the fixing recess 11 of the fixing plate 10 while pressing the underside of the protruding flange 23 and the peripheral portion surface of the fixing recess 11 so as to prevent liquid, gas, or foreign substances from being introduced into a space defined between the fixture 20 and the fixing plate 10, and the fixture 20 is securely fixed to the fixing plate 10 while the protruding flange 23 formed integrally with the upper end 21 and the lower end 22 presses the peripheral portion surface of the fixing recess 11 so as to increase a fixing force as shown in FIG. 4.

Figure 5:
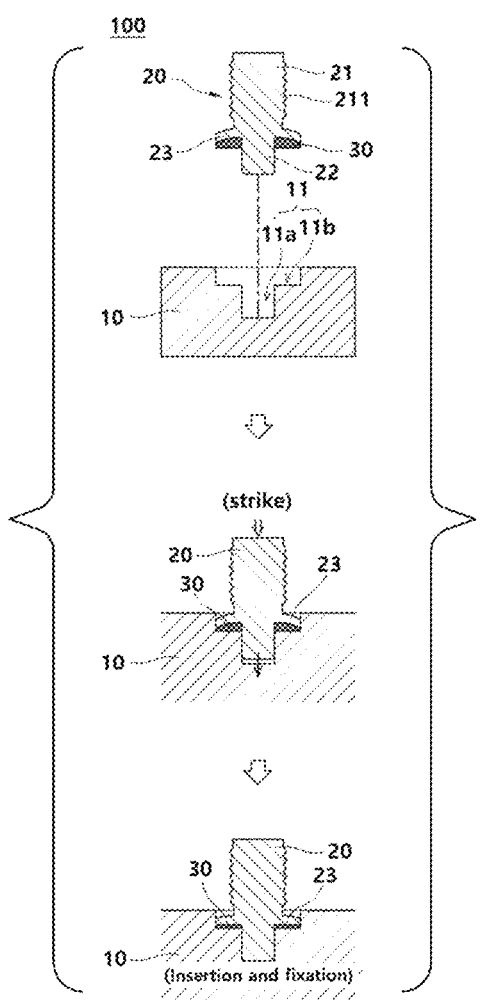
FIG. 5 is a cross-sectional view showing a configuration in which a fixture and a packing ring are fittingly seated on a multi-stepped fixing recess in a strike assembly type fixing device for a shipyard according to an embodiment of the present invention.
Figure 6:
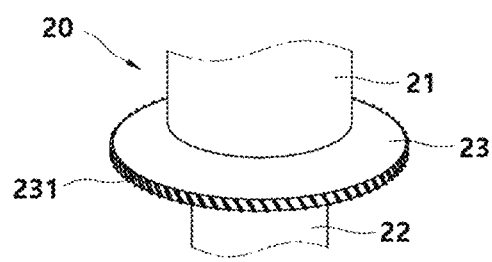
FIG. 6 is a top perspective view showing a fixture in which a release-preventive patterning surface is formed on a protruding flange applied to a multi-stepped fixing recess in a strike assembly type fixing device for a shipyard according to an embodiment of the present invention.
Figure 7:
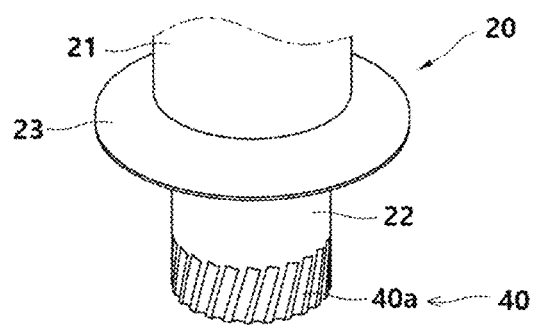
FIG. 7 is a top perspective view showing a fixture having a lower end formed with a knurled surface in a strike assembly type fixing device for a shipyard according to an embodiment of the present invention.

In the meantime, in the strike assembly type fixing device 100 for a shipyard according to an embodiment of the present invention, as shown in FIG. 5, the fixing plate 10 may be formed with a multi-stepped fixing recess 11 in which a lower recess 11a has a width smaller than that of an upper recess 11b so that the protruding flange 23 of the fixture 20 can be fittingly seated on the upper recess 11b of the fixing recess 11. In this case, since the protruding flange 23 is fittingly seated on the upper recess 11b in a state of being curved, the protruding flange 23 is tightly fitted into the upper recess 11b so that the fixing force of the fixture 20 is improved. In this case, as shown in FIG. 6, the outer circumferential surface of the protruding flange 23 of the fixture 20 may be implemented as a release-preventive patterning surface 231. By virtue of this configuration, as shown in FIG. 5, when the fixture 20 is insertedly fixed to the fixing plate 10, the release-preventive patterning surface 231 of the protruding flange 23 comes into close contact with the inner circumferential surface of the upper recess 11b so that the coupling force of the fixture 20 with respect to the fixing plate 10 can be further increased to prevent a release of the fixture 20 from the fixing plate 10.

Further, in the strike assembly type fixing device for a shipyard according to the present invention, an outer circumferential surface of the lower end 22 of the fixture 20 may be implemented as a concavo-convex surface 40 formed with a repeated concavo-convex pattern. In addition, an inner circumferential surface of the fixing recess 11 of the fixing plate 10 may be implemented as a concavo-convex surface 40 formed with a repeated concavo-convex pattern. The concavo-convex surface 40 may be a knurled surface 40a formed by a knurling process. By virtue of this concavo-convex surface structure, the fixture 20 is securely fixed to the fixing plate 10 without any slippery movement as well as the integration of the coupling portions between the fixture 20 an the fixing plate 10 is induced so that the fixation stability of the fixture 20 can be improved.

Figure 8:
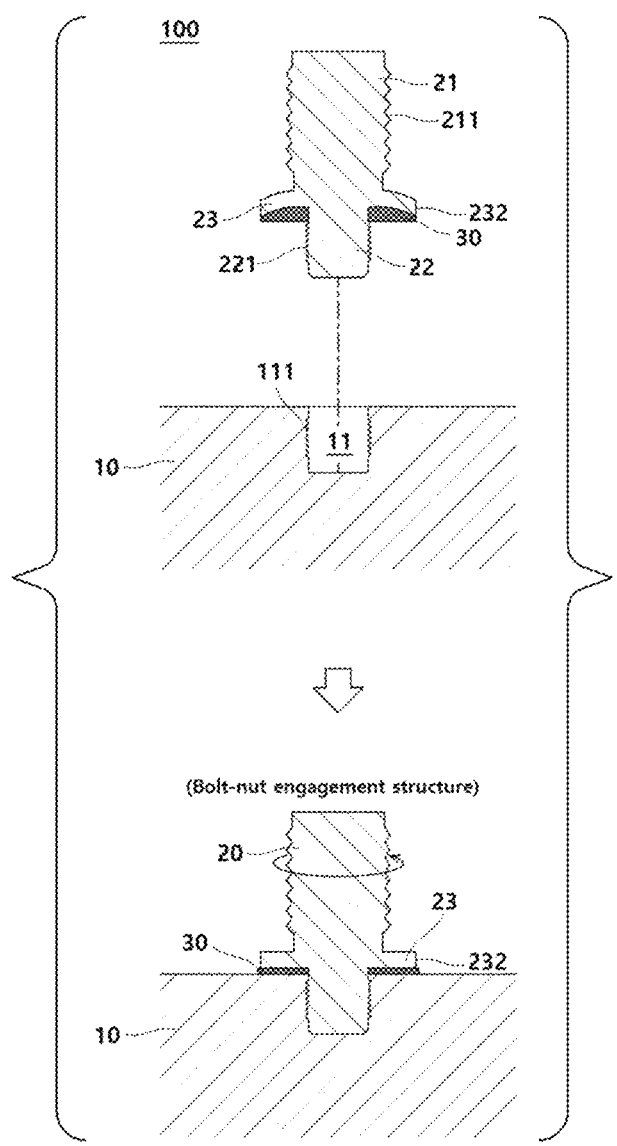
FIG. 8 is a cross-sectional view showing a configuration in which a fixture having a lower end formed with threads is securely fixed to a fixing plate in a strike assembly type fixing device for a shipyard according to an embodiment of the present invention.

In the meantime, in the strike assembly type fixing device 100 for a shipyard according to an embodiment of the present invention, the inner circumferential surface of the fixing recess 11 of the fixing plate 10 and the outer circumferential surface of the lower end 22 of the fixture 20 may be formed with threads 111 and 221 so that the fixture 20 and the fixing plate 10 can be coupled to each other in a bolt-nut engagement manner as shown in FIG. 8. By virtue of this fixture and fixing plate coupling structure, the fixing operation of the fixture 20 with respect to the fixing plate can be performed even without a separate fixture-strike tool.

Figure 9:
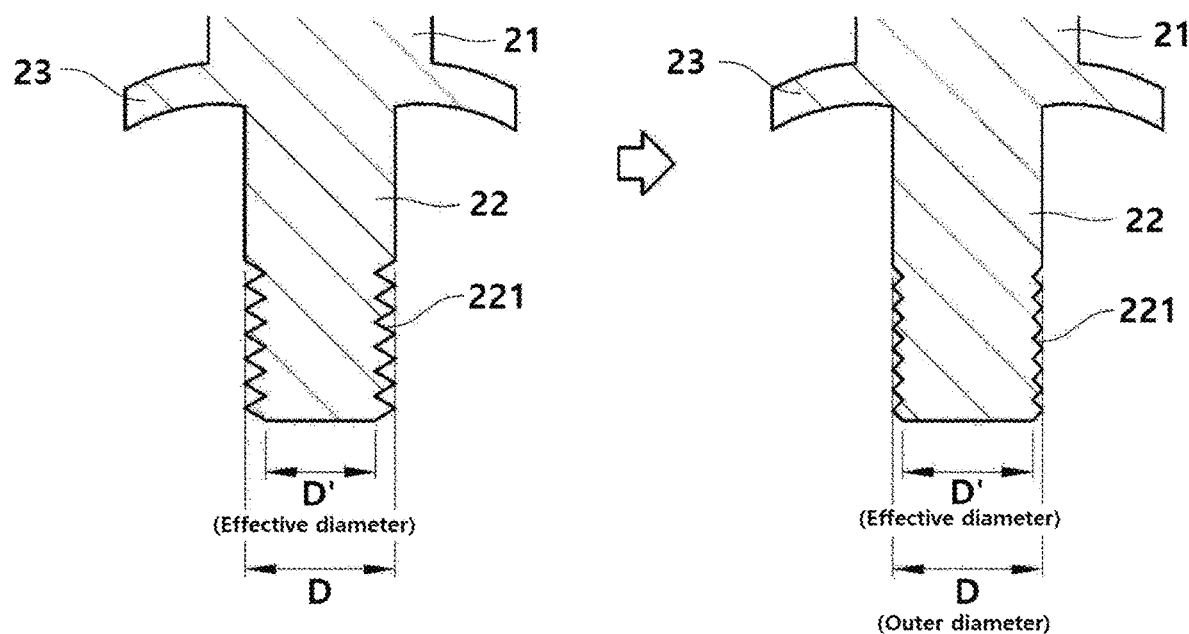
FIG. 9 is a cros-sectional view showing an external thread formation structure in which threads are formed on an outer circumferential surface of a lower end of a fixture in a strike assembly type fixing device for a shipyard according to an embodiment of the present invention.

As shown in FIG. 9, a ratio of an effective diameter D' to an outer diameter D of the lower end 22 of the fixture 20 is set to be larger so that the fixing force of the fixture with respect to the fixing plate 10 can be further increased.

Figure 10:
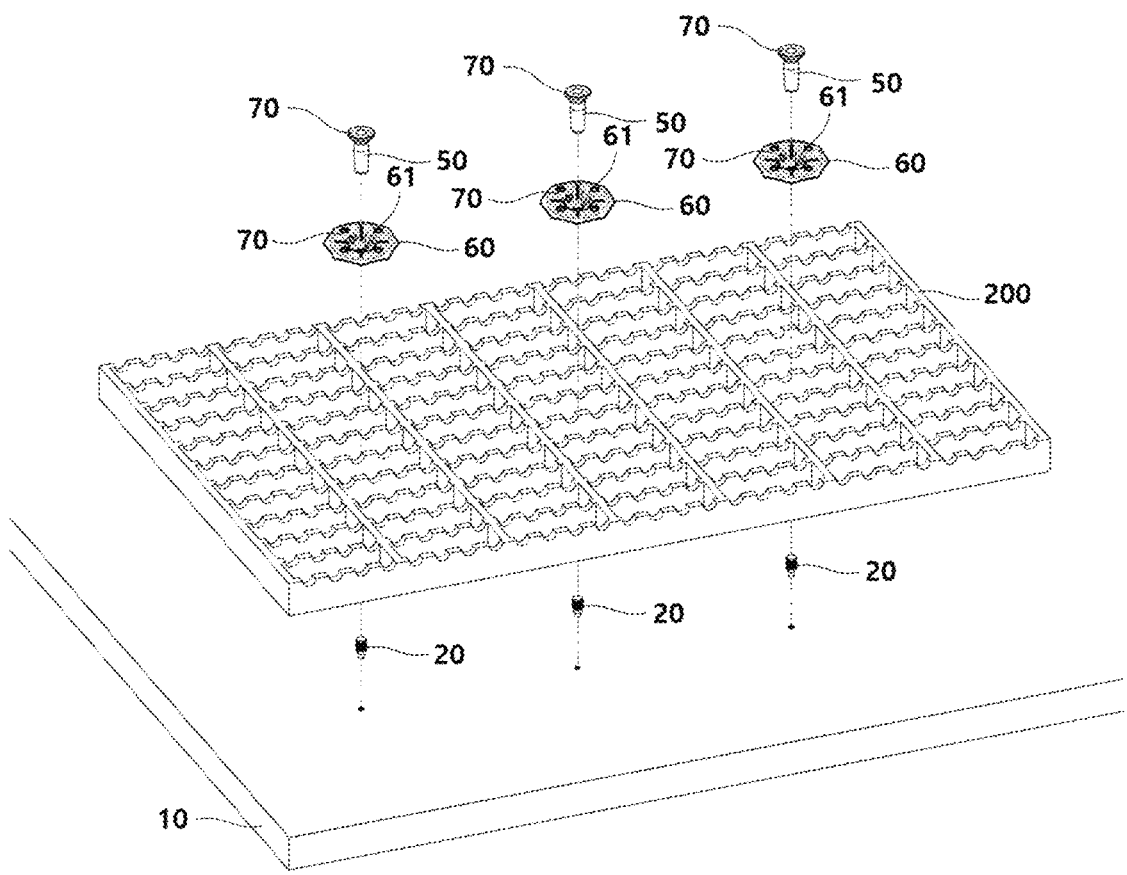
FIGS. 10 and 11 are top perspective views showing an example in which a strike assembly type fixing device for a shipyard according to the present invention is applied to a scaffolding for working.
Figure 11:
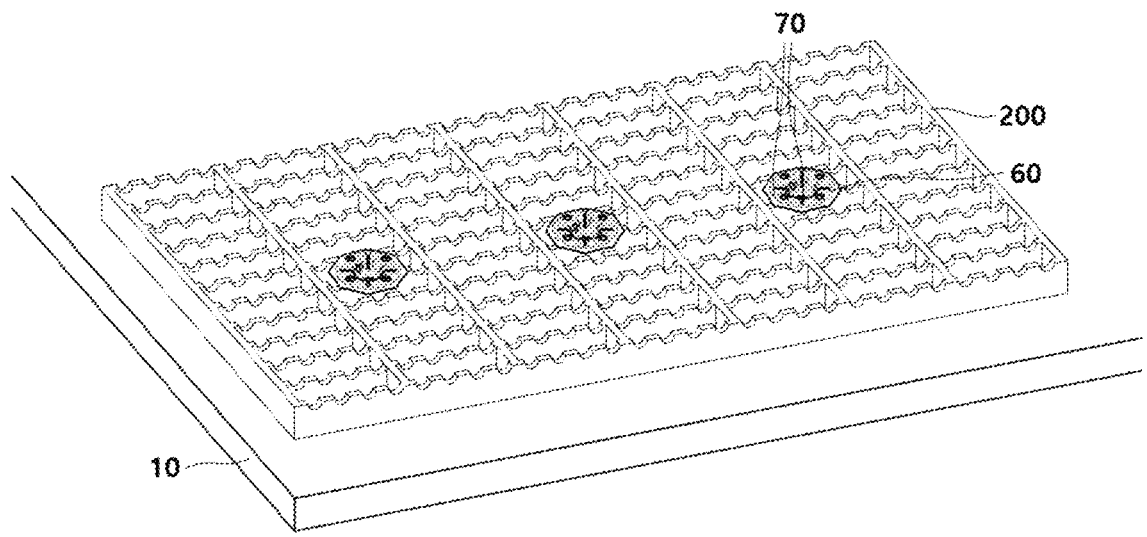

In the strike assembly type fixing device 100 for a shipyard according to an embodiment of the present invention, as shown FIGS. 10 and 11, the fixture 20 is insertedly fixed to the fixing plate 10, and the fastening element 50 passes through the scaffolding fixture 60 disposed on the top surface of the scaffolding 200 for working to allow the scaffolding fixture 60 to be coupled to the fixture 20 so that the scaffolding 200 for working can be rigidly fixed to the fixing plate 10. In this case, an identification medium 70 is formed on the top surface of the scaffolding fixture 60 and/or the top surface of the fastening element 50 so that the scaffolding fixture 60 can be identified at night time or under low illumination conditions such as a dark work environment where the light is dim. The identification medium 70 may be formed of a fluorescent material applied or coated on the top surface of the scaffolding fixture 60 or the fastening element 50 to emit light by a light stimulus, a nightglow material applied or coated on the top surface of the scaffolding fixture 60 or the fastening element 50 to absorb light and then maintain a light emitting state while releasing light upon the elimination of light, a light emitting element coupled to the top surface of the scaffolding fixture 60 or the fastening element 50 to emit light by being supplied with electric power, or a reflector or a delineator coupled to the top surface of the scaffolding fixture 60 or the fastening element 50 to reflect light beam.

The scaffolding fixture 60 is disposed on the top surface of the scaffolding 200 for working, which is positioned on the fixing plate 10, so as to allow the scaffolding 200 for working to be securely fixed to the fixing plate 10. The scaffolding fixture 60 has a through-hole 61 formed at the center thereof. The fastening element 50 is disposed on the top side of the scaffolding fixture 60. The fastening element 50 passes through the through-hole 61 of the scaffolding fixture 60 so as to be coupled to the upper end 21 of the fixture 20 insertedly fixed to the fixing plate 10, and presses the top surface of the scaffolding fixture 60 in a state of being coupled to the upper end 21 of the fixture 20 to allow the scaffolding 200 for working to be securely fixed to the fixing plate 10.

The strike assembly type fixing device 100 for a shipyard according to an embodiment of the present invention as constructed above is characterized in that the protruding flange 23 formed inclinedly downwardly at the connection portion between the upper end 21 and the lower end 22 of the fixture 20 is integrally formed with the fixture 20 to form a single body, and the packing ring 30 is provided which is fitted around the lower end 22 of the fixture 20 so as to be brought into close contact with the protruding flange 23 so that the fixture 20 is fixed to the fixing plate 10 by a compressive force by strike, thereby exhibiting the properties of being resistant to a lateral force and preventing a breakage of the lower end 22 owing to a primary fixation by the lower end 22 and a secondary fixation by the protruding flange 23, and simultaneously achieving the pressing force of the protruding flange 23 having a downwardly inclined structure, the improvement of sealibility by the packing ring 30, and the excellent foreign substance blocking effect.

In addition, the strike assembly type fixing device 100 for a shipyard according to an embodiment of the present invention is characterized in that the upper end 21, the lower end 22, and the protruding flange 23 are formed integrally with each other to constitute the fixture 20 so that the manufacturing process of the fixture 20 is simplified, thereby reducing the manufacturing cost. In particular, the strike assembly type fixing device 100 for a shipyard according to an embodiment of the present invention is applied to fix a grating installed in the shipyard so that even under high salt conditions due to the inflow of seawater through various routes in a ship building process, the fixing force of the fixture with respect to the fixing plate is maximized and the airtightness by the packing ring is improved, thereby preventing the occurrence of fine gaps between the fixing plate and the fixture, and thus blocking the penetration of salt to prevent the corrosion of the fixture and promote durability of the fixture. Besides, the strike assembly type fixing device 100 for a shipyard according to an embodiment of the present invention is characterized in that in a state in which the packing ring 30 made of a rubber material to have elasticity is pressed by the fixture 20, the airtightness is maintained to maximize sealibility, and simultaneously the fixture and the fixing plate are sealingly coupled to each other by means of the packing ring so as to prevent a damage of the fixture or the fixing plate while smoothly absorbing vibrations even under various vibration producing conditions.

While the strike assembly type fixing device for a shipyard according to the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention.

The strike assembly type fixing device for a shipyard according to the present invention has effects in that it is applied to fix a grating installed in the shipyard so that even under high salt conditions due to the inflow of seawater through various routes in a ship building process, the fixing force of a fixture with respect to a fixing plate is maximized and the airtightness by a packing ring is improved, thereby preventing the occurrence of fine gaps between the fixing plate and the fixture, and thus blocking the penetration of salt to prevent the corrosion of the fixture and promote durability of the fixture. Further, the strike assembly type fixing device for a shipyard has effects in that in a state in which the packing ring made of a rubber material to have elasticity is pressed by the fixture, the airtightness is maintained to maximize sealibility, and simultaneously the fixture and the fixing plate are sealingly coupled to each other by means of the packing ring so as to prevent a damage of the fixture or the fixing plate while smoothly absorbing vibrations even under various vibration producing conditions.

The invention claimed is:

1. A strike assembly type fixing device for a shipyard, comprising:

a fixing plate (10) having a fixing recess (11) formed thereon, the fixing recess having a hole structure along a thickness direction of the fixing plate;

a fixture (20) having a flat top surface and an upper end (21) having threads formed on a side surface of the fixture to be coupled with a separate fastening element (50), a lower end (22) fittingly fixed to the fixing recess of the fixing plate (10), and a protruding flange (23) formed inclinedly downwardly along an outer circumferential surface of a connection portion between the upper end (21) and the lower end (22), wherein the upper end (21), the lower end (22), and the protruding flange (23) are formed integrally with each other, the upper end having a circumference greater than a circumference of the lower end such that the fixture stably receives a strike impacting on the flat top surface, the lower end having a cylindrical body with a length sufficient to allow for a bottom surface of the lower end to contact with a bottom of the fixing recess in response to receiving the strike; and a packing ring (30) fitted around the lower end (22) of the fixture (20) so as to be brought into close contact with an underside of the protruding flange (23), whereby when the fixture (20) is fixed to the fixing plate (10), the packing ring (30) is brought into close contact with the underside of the protruding flange and the surface of a peripheral portion of the fixing recess (11) while pressing the underside of the protruding flange (23) and the peripheral portion surface of the fixing recess (11) so as to prevent liquid, gas, or foreign substances from being introduced into a space defined between the fixture (20) and the fixing plate (10), and the fixture (20) is securely fixed to the fixing plate (10) while the protruding flange (23) formed integrally with the upper end (21) and the lower end (22) presses the peripheral portion surface of the fixing recess (11) so as to increase a fixing force, wherein the protruding flange (23) is formed in a concentric annular ring shape such that the top surface and the bottom surface thereof are formed curvedly and the protruding flange has an upwardly convex curved surface;

wherein the packing ring (30) is formed in an annular ring shape having a preset thickness (d) in such a manner as to be shaped to be protruded radially outwardly from an outer circumferential edge (232) of the protruding flange (23) when the fixture (20) is fixed to the fixing plate (10) by a compressive force by the strike.

2. A strike assembly type fixing device for a shipyard according to claim 1, wherein the lower end has a lower side having alternate concave and convex surfaces adjacent to a bottom surface of the lower end.

3. A strike assembly type fixing device for a shipyard, comprising:

a fixing plate (10) having a fixing recess (11) formed thereon, the fixing recess having a hole structure along a thickness direction of the fixing plate;

a fixture (20) having a flat top surface and an upper end (21) having threads formed on a side surface of the fixture to be coupled with a separate fastening element (50), a lower end (22) fittingly fixed to the fixing recess of the fixing plate (10), and a protruding flange (23) formed inclinedly downwardly along an outer circumferential surface of a connection portion between the upper end (21) and the lower end (22), wherein the upper end (21), the lower end (22), and the protruding flange (23) are formed integrally with each other, the upper end having a circumference greater than a circumference of the lower end, the lower end having a cylindrical body with a length sufficient to allow for a bottom surface of the lower end to contact with a bottom of the fixing recess; and a packing ring (30) fitted around the lower end (22) of the fixture (20) so as to be brought into close contact with an underside of the protruding flange (23), whereby when the fixture (20) is fixed to the fixing plate (10), the packing ring (30) is brought into close contact with the underside of the protruding flange (23) and the surface of a peripheral portion of the fixing recess (11) while pressing the underside of the protruding flange (23) and the peripheral portion surface of the fixing recess (11) so as to prevent liquid, gas, or foreign substances from being introduced into a space defined between the fixture (20) and the fixing plate (10), and the fixture (20) is securely fixed to the fixing plate (10) while the protruding flange (23) formed integrally with the upper end (21) and the lower end (22) presses the peripheral portion surface of the fixing recess (11) so as to increase a fixing force;

wherein the protruding flange (23) is formed in a concentric annular ring shape such that the top surface and the bottom surface thereof are formed curvedly and the protruding flange has an upwardly convex curved surface;

wherein the packing ring (30) is formed in an annular ring shape having a preset thickness (d) in such a manner as to be shaped to be protruded radially outwardly from an outer circumferential edge (232) of the protruding flange (23) when the fixture (20) is fixed to the fixing plate (10); and wherein the lower end has an external thread in the form of a helix on the cylindrical body and the fixing recess has an internal thread in the form of a helix on a sidewall of the recess for mating with the external thread such that a rotation of the fixture allows a linear movement of the fixture along a depth direction of the fixing recess.

4. A strike assembly type fixing device for a shipyard according to claim 3, wherein the fixing recess is further configured with a space accommodating the protruding flange, the space having a greater diameter than a hole receiving the lower end.

\* \* \* \* \*